United States Patent
Jeon et al.

(10) Patent No.: US 7,573,600 B2
(45) Date of Patent: Aug. 11, 2009

(54) PRINTING SYSTEM FOR PREVENTING ERRORS DUE TO A DOUBLE FED PAPER MEDIUM AND METHOD OF CONTROLLING THE SAME

(75) Inventors: Jun-bae Jeon, Seoul (KR); Cheol-ju Yang, Suwon-si (KR); Su-kyoung Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 822 days.

(21) Appl. No.: 10/959,147

(22) Filed: Oct. 7, 2004

(65) Prior Publication Data

US 2005/0280859 A1  Dec. 22, 2005

(30) Foreign Application Priority Data

Jun. 16, 2004  (KR) .................. 10-2004-0044366

(51) Int. Cl.
  *G06K 15/02*  (2006.01)
(52) U.S. Cl. .................. 358/1.2; 358/449; 358/451; 358/528
(58) Field of Classification Search .............. 358/528, 358/449, 451, 1.2
  See application file for complete search history.

(56) References Cited

U.S. PATENT DOCUMENTS 5,053,885 A * 10/1991 Telle .................. 358/449
5,057,936 A * 10/1991 Bares .................. 358/405
5,580,046 A * 12/1996 Beaufort et al. ............ 271/3.16
5,649,033 A * 7/1997 Morikawa et al. .......... 382/297
5,671,163 A * 9/1997 Iida .............................. 399/45
5,859,967 A * 1/1999 Kaufeld et al. ................. 726/5
5,890,708 A * 4/1999 Song ....................... 271/10.03
6,040,923 A * 3/2000 Takashimizu et al. ....... 358/498
6,437,876 B1 * 8/2002 Phang et al. ................. 358/1.2

FOREIGN PATENT DOCUMENTS

| JP | 2001-026343 | 1/2001 |
| JP | 2003-306251 | 10/2003 |
| KR | 98-952 | 3/1998 |
| KR | 1998-000952 | 3/1998 |
| KR | 1020010009062 | 2/2001 |
| KR | 2001-084546 | 9/2001 |

* cited by examiner

*Primary Examiner*—King Y Poon
*Assistant Examiner*—William C Storey
(74) *Attorney, Agent, or Firm*—Roylance, Abrams, Berdo & Goodman, L.L.P.

(57) ABSTRACT

A system and method of controlling printing are disclosed. The system and method comprise inputting image data printed by a printing section and a preset value for a print medium's size corresponding to the image data; measuring a size of each print medium being fed to the printing section; comparing the measured value for the each measured print medium and the preset value for the print medium's size; counting the number of times in which difference is occurred between the measured value and the preset value; and determining whether the print mediums fed to the printing section are different from the preset print medium's size by comparing the counted number of times and a predetermined reference number of times.

9 Claims, 2 Drawing Sheets

PRINTING SYSTEM FOR PREVENTING ERRORS DUE TO A DOUBLE FED PAPER MEDIUM AND METHOD OF CONTROLLING THE SAME

CROSS-REFERENCE TO RELATED APPLICATIONS

This application claims the benefit under 35 U.S.C. § 119 (a) of Korean Patent Application No. 2004-44366, filed on Jun. 16, 2004, in the Korean Intellectual Property Office, the entire contents of which are incorporated herein by reference.

BACKGROUND OF THE INVENTION

1. Field of the Invention

The present invention relates to a printing system and a method of controlling the same. More particularly, the present invention relates to a printing system and method for preventing printing errors due to a double fed paper medium.

2. Description of the Related Art

A printing system, such as a copying machine, an all-in-one machine and a laser printer, receives image data from a host through an interface such as a cable, so that image data can be printed on paper.

Such a printing system employs a printing process using an image forming apparatus by way of an example, wherein the image forming apparatus is connected to a Personal Computer (PC). In this case, a program file corresponding to a content to be printed out is read from the PC to input a printing instruction. Then, a printer driver is driven by the printing instruction. A user is allowed to designate a paper size for the paper to be printed on using the image forming apparatus through the printer driver. The printer driver receives image data and transmits the image data adjusted to a size corresponding to the designated size of the print medium to the image forming apparatus.

A control section of the image forming apparatus initiates printing based on the input image data. The size of a print medium fed from a paper tray is measured using a feeding sensor or the like. That is, the size of a print medium is determined by measuring the length of time until the feeding sensor detects the trailing edge of the print medium after the feeding sensor has detected the leading edge of the print medium. In addition, the control section determines whether the size of the print medium measured by the feeding sensor is the same as a preset print medium's size set by the printer driver, by comparing the measured size and the preset size.

If there is no difference between the values of compared sizes, image data is generated and printed according to the preset print medium's size set by the printer driver.

Whereas, if there is a difference between the values of compared sizes, the size of image data is adjusted based on the measured size of the print medium. As such, it is possible to prevent image data, which is larger than the measured size of the print medium, from being printed, whereby it is possible to prevent an image carrier or an image-transfer medium from being corrupted.

However, print mediums may sometimes be fed in an overlapped state as in the case of a double-feeding of paper. In such a case, the feeding sensor will recognize the print mediums as being larger than the real size thereof. Accordingly, the control section input with such information will readjust the size of image data based on the erroneously measured size of the print mediums. As a result, there is a problem in that even though print mediums with a normal size are fed, image data adjusted to a larger size may be printed on the print medium without correctly detecting such a situation.

SUMMARY OF THE INVENTION

Accordingly, the present invention has been made to solve the above-mentioned problems occurring in the prior art, and an object of the present invention is to provide a printing system and a method of controlling the printing operation in such a way that it is possible to avoid a print error when a size of print mediums is erroneously recognized due to double-feeding or the like.

In order to achieve the above-mentioned object, there is provided a printing system comprising a printing section for forming an input image data into a print image; a sensor for measuring a size of each print medium provided to the printing section; a first comparison section for comparing a preset value set by a printer driver for a print medium's size and a measured value for the size of each of print mediums measured by the sensor; a counter section for counting a variable for the number of times in which a difference occurs between the preset value and the measured values, the difference being recognized as a result of the values being compared by the first comparison section; a second comparison section for comparing the variable counted by the counter section and a predetermined reference number of times; a memory stored with the preset value, the counted variable, and the predetermined reference number of times; and a control section for individually controlling the first and second comparison section, the counter section and the printing section, the control section adjusting the image data on the basis of the size of the printing mediums measured by the sensor when the counted variable exceeds the predetermined reference number of times.

The control section initializes the counted variable stored in the memory when it is determined that the preset value and the measured value are equal.

In order to achieve the above object, there is also provided a method of controlling a printing operation. The method comprises inputting image data printed by a printing section and a preset value for a print medium's size corresponding to the image data; measuring a size of each of print mediums being fed to the printing section; comparing the measured value for each measured print medium and the preset value for the print medium's size; counting the number of times in which a difference occurs between the measured value and the preset value; and determining whether the size of print mediums fed to the printing section are different from the preset print medium's size by comparing the counted number of times and a predetermined reference number of times.

The method may further comprise a step of adjusting the image data on the basis of the measured size of print mediums if it is determined that at least one print medium being fed has a size different from the preset print medium's size.

The method may further comprise a step of initializing the counted number of times if the preset value and the measured value are equal in the comparing step.

The method may further comprise a step of initializing the counted number of times if the preset value and the measured value are equal in the comparing step.

In the determining step, it is determined that the print mediums being fed have a size different from the preset print medium's size if the counted number of times exceeds the reference number of times.

Furthermore, the adjusting step may comprise a step of adjusting the length of the image data.

Moreover, the adjusting step may comprise a step of adjusting the width of the image data.

Still yet, the adjusting step may comprise the steps of adjusting the length of the image data; and adjusting the width of the image data.

BRIEF DESCRIPTION OF THE DRAWINGS

The above and other objects, features and advantages of the present invention will be more apparent from the following detailed description taken with reference to the accompanying drawings, in which.

Throughout the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings.

Figure 1:
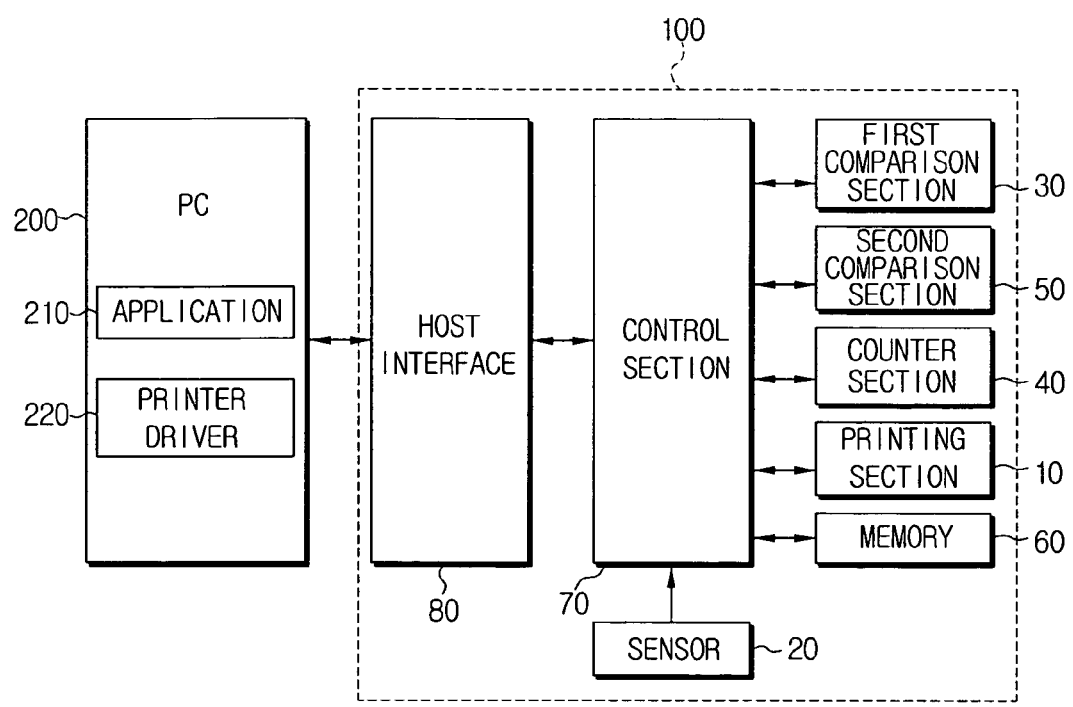
FIG. 1 is a block diagram illustrating a printing system according to an embodiment of the present invention.

FIG. 1 is a block diagram illustrating a printing system according to an embodiment of the present invention. Referring to FIG. 1, a printing system 100 comprises a printing section 10, a sensor 20, a first comparison section 30, a second comparison section 50, a counter section 40, a memory 60 and a control section 70.

Here, reference numeral 200 indicates a Personal Computer (PC) as an example of an external appliance for interfacing image data or the like through a host interface 80, a cable, and the like. An application 210 for selecting a document and the implementing a printing operation and a printer driver 220 are setup in the PC 200. The printer driver 220 generates image data and also generates information for the total number of pages of a job unit. In addition, the printer driver 220 provides a function for setting the type and size of print mediums on which the generated image data is printed, the number of sheets to be printed, etc.

The printing section 10 performs a series of operations of forming and transferring an image, so that image data received through the host interface 80 is printed on one or more print mediums under the control of the control section 70.

The sensor 20 detects each print medium being fed to the printing section 10 through an automatic paper feeding tray or a manually operated paper feeding tray. That is, the sensor 20 measures the length of time until the sensor 20 detects the trailing edge of each print medium after the sensor 20 has detected the leading edge of the print medium. Based on information for the length of time measured in this manner, the control section 70 is capable of determining the occurrence of jamming, a size of each print medium, and so on. The sensor 20 may be either a contact feeding sensor or a non-contact feeding sensor.

The first comparison section 30 compares a measured value for a size of each print medium measured by the sensor to a preset value set input by the printer driver for a print medium's size under the control of the control section 70.

Whenever the values compared by the first comparison section 30 are different from each other, i.e., there is difference between the measured value and the preset value, the counter section 40 counts a variable Y which represents the number of times the difference occurred. For example, when two sheets of print mediums are continuously fed, the counted variable Y will be '2' if the measured value for each of the two print mediums is different from the preset value for the print medium's size. The counter section 40 is also controlled by the control section 70.

The second comparison section 50 is controlled by the control section 70 to compare the variable Y counted by the counter section 40 and the predetermined reference number of times N.

The memory 60 stores the preset value, the counted variable Y, reference number of times N, the input image data, etc.

The control section 70 converts the image data received through the host interface 80 into image data and controls the image data to be printed onto print mediums through the printing section 10. In addition, the control section 70 obtains a preset value for a print medium's size via the received image data and stores the preset value in the memory 60.

In addition, the control section 70 controls the first and second comparison sections 30 and 50, the counter section 40 and the printing section 10. In addition, the control section 70 determines whether the size of a print medium detected by the sensor 20 and the preset print medium's size are different from each other, on the basis of the result of comparison between the counted variable Y and the reference number of times N by the second comparison section 50. In addition, the control section 70 adjusts the input image data on the basis of the measured size of the print mediums and controls the adjusted image data to be printed in the printing section 10.

Figure 2:
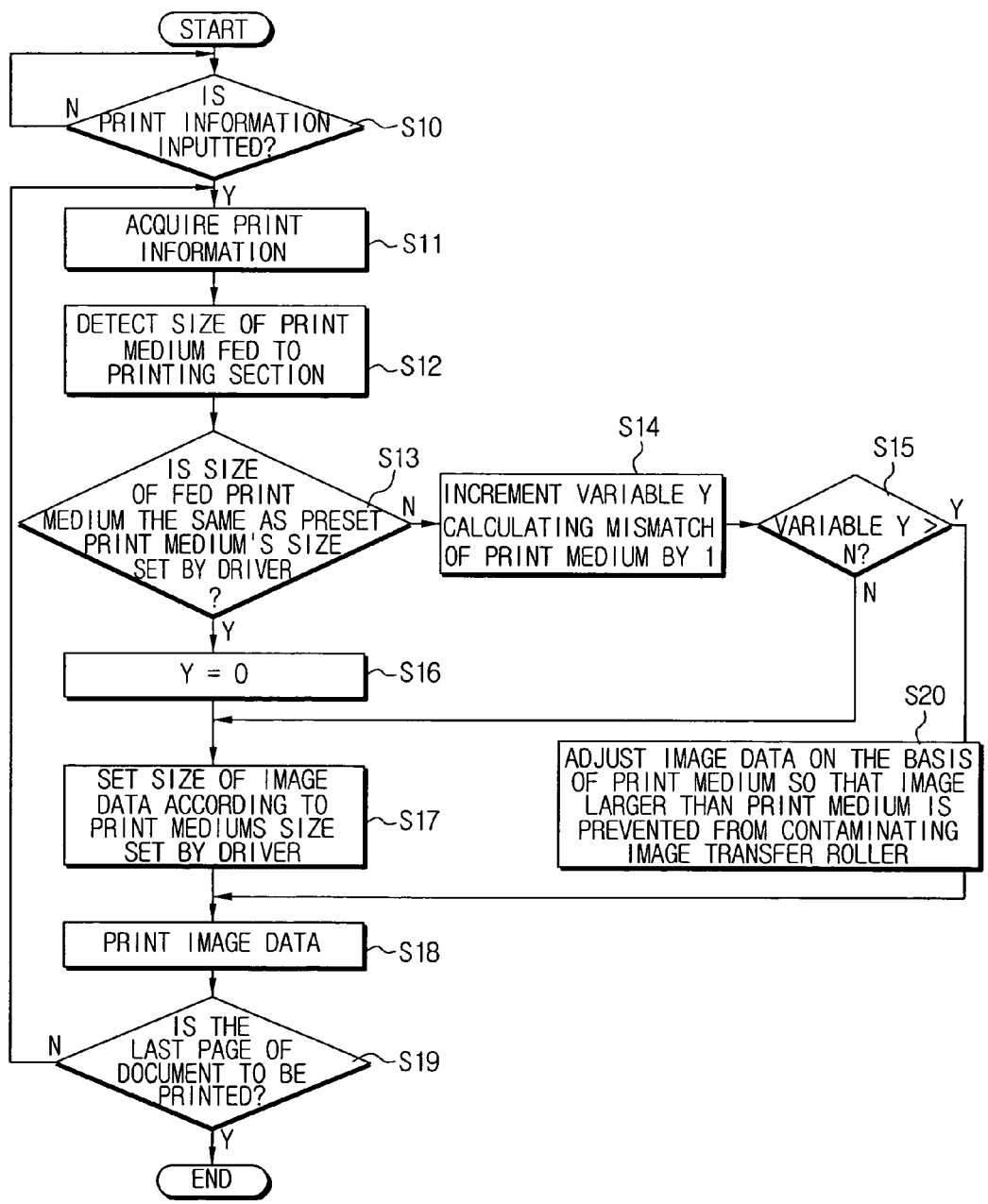
FIG. 2 is a flowchart illustrating a method for controlling a printing operation according to another embodiment of the present invention.

Now, a method of controlling the printing system constructed as described above according to an embodiment of the present invention will be described in detail with reference to FIG. 2.

Firstly, if a print instruction is rendered through the application 210 from the host 20 and the printer driver 220 produces and transmits print information regarding image data, print mediums, and so on the host interface 80 transmits the image data received from the host interface 80 to the control section 70. The control section 70 determines whether the print information including the image data is received from the host 200 at step S10, and obtains and stores the print information in the memory 60 at step S11. Here, the print information includes image data, and data relating to a print medium's size set by the printer driver, the number of sheets to be printed, and so on.

The control section 70 obtains print information as well as controls the paper-feeding section to transfer a print medium to the printing section 10, and the sensor 20 detects the size of the print mediums being fed at step S12. For example, the sensor 20 measures the length of time until the trailing edge of each print medium being fed is detected after the leading edge of the print medium has been detected. Therefore, the control section 70 is capable of calculating the size of such a print medium on the basis of the measured length of time input from the sensor 20. In this manner, the sensor 20 sequentially detects the sizes of print mediums being fed for printing.

The control section 70 controls the first comparison section 30 to compare the measured sizes of print mediums detected by the sensor 10 to the preset value for a print medium's size previously set by the printer driver and stored in the memory 60 at step S13. As the result of the comparison, if it is determined that there is a difference between the measured value and the preset value, the control section 70 controls the counter section 40 to count a variable Y for calculating how many times the difference occurs at step S14. At step S14, it is preferable to count the number of times while incrementing the variable Y by '1.'

Thereafter, the control section 70 controls the second comparison section 50 to compare the counted variable Y and the predetermined reference number of times N that was previously set and stored in the memory 60. Here, the reference number of times N is previously determined through an experiment or various tests, wherein for example, two times may be suitable. That is, if a result has been obtained using the statistics or through an experiment that print mediums may be overlapped and fed in double-feeding up to one time, it may be determined that double-feeding is caused even if a mismatch occurred at least once. However, upon considering that double-feeding is rarely caused two or more times in succession, it is possible to set the reference number times N to two times.

Meanwhile, if the variable Y is smaller than the reference number of times N at step S15, the control section 70 determines that the size of papers is erroneously recognized due to double-feeding or the like; the control section 70 processes image data into image data in a preset print medium's size set by the printer driver 220 at step S17 and controls the printing section 10 to print the image data in the preset print medium's size at step S18.

In addition, the control section determines whether the last part of the document to be printed is printed or not and determines whether to continue printing at step S19.

If steps S12, S13, S14, S15, S17 and S18 are continuously repeated, the variable Y may be increased to exceed the reference number of times N. In such a case, the control section 70 determines that the size of print mediums being fed is different from the preset print medium's size, and for a page now being printed or the next page, the control section 70 adjusts the image data on the basis of the size of the print mediums being fed, in accordance with an instrumental specification of the printing system at step S20. That is, because double-feeding is not caused but the size of print mediums loaded in the practical paper-feeding section is larger or smaller than a practically preset print medium's size, the control section 70 adjusts the size of image data. The control section 70 may adjust both the length and width of the image data. Furthermore, the control section 70 may adjust at least one of the length and width of the image data. The control section 70 controls the printing section 10 to print the adjusted image data.

In addition, if it is determined that the measured value of a print medium and the preset value for such a print medium are determined as being identical with each other at step S13, the control section 70 initializes the variable Y at step S16. That is, even if the variable Y were counted and increased before, the control section 70 will determine that the size of print mediums is erroneously recognized due to double-feeding or the like and initialize the variable Y, once a normal condition is occurred. Then, the control section 70 generates image data to be printed on the basis of the preset printing medium's size.

As described above, according to embodiments of the inventive printing system and method of controlling the same, if the print mediums are fed in an overlapped state as in double-feeding, it is possible to prevent the size of the print mediums recognized by a sensor from becoming different from a preset print medium's size; accordingly, it is possible to prevent the image data from being erroneously adjusted and printed. That is, image data is adjusted and printed to be consistent with the size of print mediums being fed, only when the size of the print mediums are recognized as being different from a preset print medium's size over the predetermined number of times in succession.

Therefore, there is an advantage in that it is possible to prevent erroneously adjusted image data from being printed, whereby the occurrence of errors can be prevented, and in that it is possible to prevent an image-transfer medium, an image carrier or the like from being adversely affected by magnified image data or the like.

While certain embodiments of the present invention have been shown and described with reference to the representative embodiments thereof in order to exemplify the principle of the present invention, the present invention is not limited to the embodiments described. It should be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. A printing system comprising:
    a printing section for forming an image with an input image data; a sensor for measuring a size of each print medium fed to the printing section, wherein each of print mediums fed is of a same size; a first comparison section for comparing a preset value set by a printer driver for a print medium's size with a measured value for the size of each print medium measured by the sensor;
    a counter section for counting a variable for the number of times in which a difference occurs between the preset value and the measured values, the difference being recognized as a result of the preset value and the measured value being compared by the first comparison section;
    a second comparison section for comparing the variable counted by the counter section with a predetermined reference number of times;
    a memory for storing the preset value, the counted variable, and the predetermined reference number of times; and
    a control section for individually controlling the first and second comparison section, the counter section and the printing section, the control section adjusting the image data based on the size of the printing mediums measured by the sensor when the counted variable exceeds the predetermined reference number of times.

2. A printing system as claimed in claim 1, wherein the control section initializes the counted variable stored in the memory when it is determined that the preset value and the measured value are equal.

3. A method of controlling printing comprising the steps of:
    inputting image data to be printed by a printing section and a preset value for a print medium's size corresponding to the image data;
    measuring a size value of each print medium being fed to the printing section, wherein each of print mediums fed is of a same size;
    comparing the measured size value for the each measured print medium with the preset value for the print medium's size;
    counting a number of times, in which a difference occurs between the measured size value and the preset value; and
    Declaring that the print mediums fed to the printing section are of a different size than the preset print medium's size when the counted number of times exceeds a predetermined reference number of times.

4. A method as claimed in claim 3, further comprising the step of:
    adjusting the image data based on the size of print mediums measured when it is declared that the print mediums fed have a different size from the preset print medium's size.

5. A method as claimed in claim 3, further comprising the step of:

initializing the counted number of times if the preset value and the measured value are the same in the comparing step.

6. A method as claimed in claim 4, further comprising the step of:

initializing the counted number of times if the preset value and the measured value are the same in the comparing step.

7. A method as claimed in claim 4, wherein the adjusting step further comprises the step of:

adjusting the length of the image data.

8. A method as claimed in claim 4, wherein the adjusting step further comprises the step of:

adjusting the width of the image data.

9. A method as claimed in claim 4, wherein the adjusting step further comprises the steps of:

adjusting the length of the image data; and
    adjusting the width of the image data.

\* \* \* \* \*